(12) United States Patent
Butzmann

(10) Patent No.: US 10,050,314 B2
(45) Date of Patent: Aug. 14, 2018

(54) LITHIUM-ION ENERGY STORE AND METHOD FOR MATCHING POTENTIALS OF A MEASUREMENT SECTION AND OF A MAIN SECTION OF THE LITHIUM-ION ENERGY STORE

(71) Applicant: Robert Bosch GmbH, Stuttgart (DE)

(72) Inventor: Stefan Butzmann, Schalksmühle (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 15/028,890

(22) PCT Filed: Sep. 25, 2014

(86) PCT No.: PCT/EP2014/070551
§ 371 (c)(1),
(2) Date: Apr. 12, 2016

(87) PCT Pub. No.: WO2015/055401
PCT Pub. Date: Apr. 23, 2015

(65) Prior Publication Data
US 2016/0254571 A1 Sep. 1, 2016

(30) Foreign Application Priority Data

Oct. 14, 2013 (DE) .................. 10 2013 220 709

(51) Int. Cl.
| | |
|---|---|
| *H01M 10/42* | (2006.01) |
| *H01M 10/0525* | (2010.01) |
| *H01M 10/48* | (2006.01) |
| *H01M 6/50* | (2006.01) |

(52) U.S. Cl.
CPC ....... *H01M 10/425* (2013.01); *H01M 6/5005* (2013.01); *H01M 10/0525* (2013.01); *H01M 10/48* (2013.01); *H01M 2010/4271* (2013.01); *Y02T 10/7011* (2013.01)

(58) Field of Classification Search
CPC .................................................. H01M 10/00
See application file for complete search history.

(56) References Cited

U.S. PATENT DOCUMENTS

2014/0087227 A1* 3/2014 Shih .................. H01M 2/0277
429/99
2014/0349150 A1* 11/2014 Matsuyama ........ H01M 10/482
429/61

FOREIGN PATENT DOCUMENTS

| EP | 2442400 | 4/2012 |
| GB | 254852 | 7/1926 |

OTHER PUBLICATIONS

International Search Report for Application No. PCT/EP2014/070551 dated Dec. 22, 2014 (English Translation, 2 pages).

* cited by examiner

*Primary Examiner* — Jacob Marks
(74) *Attorney, Agent, or Firm* — Michael Best & Friedrich LLP

(57) ABSTRACT

The present invention relates to a lithium-ion energy store, comprising an electrode comprising a main section and comprising a measurement section electrically isolated from the main section, a counterelectrode and a separator between the electrode and the counterelectrode, wherein a measurement cell, which forms part of the lithium-ion energy store, comprises the measurement section of the electrode, a counterelectrode measurement section, which is opposite the measurement section of the electrode in relation to the separator, and a section of the separator which is arranged between the measurement sections of the electrode and the counterelectrode measurement section, and a main cell, which forms part of the lithium-ion energy store, the main section of the electrode, a counterelectrode main section, which is opposite the main section of the electrode in relation to the separator, and a section of the separator which is arranged between the main section of the electrode and the counterelectrode main section, wherein the lithium-ion energy store comprises a matching device, by means of which an electrical potential of the measurement section and an electrical potential of the main section can be matched to one another.

5 Claims, 1 Drawing Sheet

LITHIUM-ION ENERGY STORE AND METHOD FOR MATCHING POTENTIALS OF A MEASUREMENT SECTION AND OF A MAIN SECTION OF THE LITHIUM-ION ENERGY STORE

BACKGROUND OF THE INVENTION

The present invention relates to a lithium-ion energy store and a method for matching potentials of a measurement section and of a main section of the lithium-ion energy store.

Lithium-ion energy stores have a high cell voltage and a good ratio between stored energy and weight and are therefore suitable for mobile applications, in particular for electrically operated vehicles. Lithium-ion energy stores are frequently manufactured as a wound construction, wherein a flat material is wound, which comprises two flat electrodes as well as a separator that electrically isolates the electrodes from one another. The electrodes typically comprise a metal collector which is preferably coated with an electrode material on both sides. Aluminum foil is typically used in the cathode electrode and copper foil in the anode electrode as the metal collector. The separator is usually imbued with an ion transport means which facilitates the passage of ions through the separator.

Lithium-ion energy stores are known as batteries and accumulators. It is furthermore known how to measure the current provided by a lithium-ion energy store with a multiplicity of different sensors, for example sensors comprising a shunt resistance or Hall sensors. Besides measuring means for the direct current flow, a multiplicity of other sensors and/or theoretical models, with which properties of lithium-ion energy stores can be acquired, exists. To this end, a number of specified properties of the energy store are typically acquired using the sensors and the theoretical models are applied to the acquired values in order to make inferences about the electrical properties or, respectively, the state of the energy store.

The European patent publication EP 2442400 A1 discloses an electrochemical cell which is based on lithium technology and comprises an internal reference electrode. Said reference electrode is embedded in the separator; thus enabling a reference cell to form between the reference electrode and each of the conventional electrodes of the cell. By specifying the properties of the two reference cells which represent the half cells of the energy store, information can be obtained about each of these half cells and therefore also about the entire energy store. In so doing, either the current of the entire cell is measured or a state of the energy store is inferred from other parameters or theoretical models. The additional electrode embedded in the separator prevents the ion flow at this location and carries the risk of a short circuit of the electrodes.

SUMMARY OF THE INVENTION

According to the invention, the lithium-ion energy store is provided with a measurement cell, a main cell and a matching device by means of which an electrical potential of the measurement section and an electrical potential of the main section can be brought to a potential that is at least approximately the same.

In the lithium-ion energy store according to the invention, at least one anode electrode and one cathode electrode are divided into a main section and a measurement section, which are electrically isolated from one another, whereby a measurement cell and a main cell of the energy store result. The measurement cell comprises the measuring section of the electrode, a counterelectrode measurement section, which is opposite the measurement section of the electrode in relation to the separator, and a section of the separator which is situated between the measurement section of the electrode and the counterelectrode measurement section. The main cell comprises the counterelectrode main section of the electrode and, analogous to the measurement cell, a counterelectrode main section, which is opposite the main section of the electrode in relation to the separator, and a section of the separator which is arranged between the main section of the electrode and the counterelectrode main section. An electrode of the energy store comprises the main section and the measurement section. The measurement section is typically considerably smaller than the main section. A counterelectrode lies opposite the electrode in relation to the separator and can be simultaneously operative for the main section and the measurement section. A part of the counterelectrode denoted as the counterelectrode measurement section lies opposite the measurement electrode, whereas a part of the counterelectrode denoted as the counterelectrode main section lies opposite the main electrode. It is possible to use the anode as well as the cathode as the electrode while the cathode or respectively the anode is correspondingly used as the counterelectrode. The separator can be provided as a single, continuous element for the measurement cell as well as for the main cell. It is however conceivable to also divide the separator or/and the counterelectrode so that sections result which are associated in each case with the main section of the electrode or the measurement section of the electrode.

The main power output of the lithium-ion energy store is produced by the main cell. The main cell is typically considerably larger than the measurement cell with regard to the storage capacity of the energy cell as well in relation to the area proportion on the electrode or the counterelectrode. The capacity of the main cell is, for example, at least ten times the capacity of the measurement cell. The properties of the measurement cell, which are based on surface area, such as the current output capacity, an energy content and the like, can accordingly be transferred from the measurement cell to the main cell by scaling by a factor of the area ratio of the two cells. Properties of the measurement cell which are not based on area can be transferred from the measurement cell to the main cell without area-based scaling, such as a cell voltage, a charging state, a state of ageing or something similar.

In a discharging operation, the main cell transmits current to a load to which the energy store is connected, and said main cell is recharged during the charging operation. In order to keep the state of the cells the same, the measurement cell can be synchronously discharged and charged. Should, however, a condition develop in which the state of charge of the cells differs, the measurement section and the main section then have different potentials in relation to the counterelectrode. This can falsify a measurement because the electrochemical states in the measurement cell and the main cell are not the same. A potential difference between the measurement section and the main section of the electrode can be compensated by means of matching device according to the invention. After such a compensation, the electrochemical states of the measurement cell and the main cell are at least approximately, preferably completely, matched to one another. Properties of the main cell can then be at least approximately correctly acquired using the measurement cell.

In one embodiment of the lithium-ion energy store, the matching device can produce a connection between the main section and the measurement section of the electrode, which preferably has low impedance. A current flows from the main section to the measurement section or vice versa via this connection, depending on which of the two sections has a higher potential. The potentials of the main section and the measurement section or, respectively, the voltages of the main cell and the measurement cell conform to one another by means of the transfer of charge from the measurement cell to the main cell or vice versa.

In a further embodiment of the lithium-ion energy store, the matching device comprises a relay, which, for example, can also be embodied as an electric contactor, a transistor, which can be embodied as a field effect transistor, in particular as a MOSFET, as a bipolar transistor or as an IGBT or something similar, and/or a thyristor and/or a power source. A power source has a low internal resistance just like a closed switch, so that is conceivable to produce a low-impedance connection across it. A low-impedance connection can, for example, have a resistance of fractions of an ohm or from a few ohms up to several tens of ohms or more. The magnitude of the resistance influences the speed of the matching operation and the proportions of the energy store and the resistance of the heating by means of the potential compensation. Depending on the size of the measurement cell and the main cell, different resistance values can be suitable or optimal.

According to a further aspect of the present invention, a method is proposed with which the potentials of the measurement section and the main section can be matched to one another. To this end, the measurement section is connected to the main section via the matching device in an electrically conductive manner. In this way, the matching current described above can flow between the measurement section and the main section.

In a particularly preferred manner, the connection is maintained until a sufficient matching of the potentials has taken place after a compensation time.

In one embodiment of the method, a connection is effected by a relay or an electric contactor or something similar being closed, a field effect transistor, in particular a MOSFET and/or a bipolar transistor being through-connected, a thyristor being ignited and/or the connection being established via the power source. The aforementioned switching elements or components provide a connection, via which an equalizing current can flow.

In a further embodiment of the method, the connection between main section and measurement section for effecting a potential equalization is carried out prior to a measurement using the measurement cell. The measurement can be a measurement step of a method which comprises further steps.

BRIEF DESCRIPTION OF THE DRAWINGS

Exemplary embodiments of the invention are subsequently described in detail with reference to the accompanying drawings. In the drawings.

DETAILED DESCRIPTION

Figure 1:
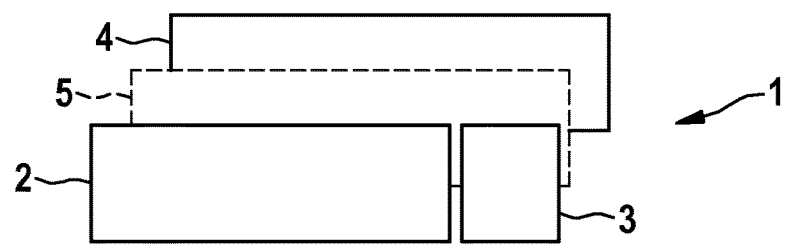
FIG. 1 shows a schematic depiction of the layout of an energy store according to the invention.

FIG. 1 shows schematically the layout of a lithium-ion energy store 1. Said layout comprises an electrode 2, 3 which is divided into a main section 2 and a measurement section 3. The main section 2 and the measurement section 3 are electrically isolated from one another. The energy store further comprises a separator 5 and a counterelectrode 4, wherein the separator 5 is disposed between the electrode 2, 3 and the counterelectrode 4 and prevents electrons from passing between electrode and counterelectrode. The main section 2, the measurement section 3 and the counterelectrode 4 are preferably each provided with a separate terminal for contacting purposes, which are not shown in FIG. 1. The electrode 2, 3 and the counterelectrode 4 are in each case substantially planar structures which can be rolled up together. The main section 2 together with the counterelectrode 4 and the section of the separator 5 lying between them form a main cell of the energy store. A measurement cell of the energy store is formed from the measurement section 3, the counter electrode 4 and the section of the separator 5 that lies between these two elements.

Figure 2A:
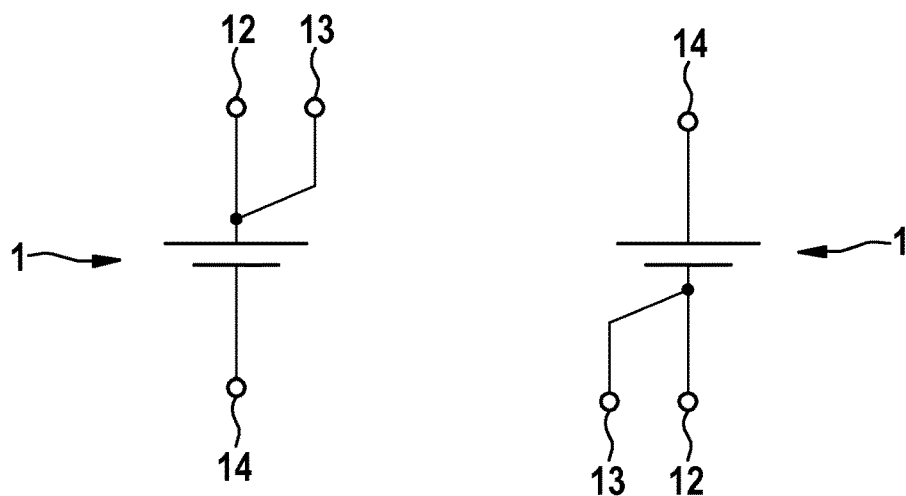
FIG. 2a shows a circuit symbol of a first variant of the energy store according to the invention.

FIG. 2a shows a circuit symbol for the lithium-ion energy store 1. The energy store 1 itself is shown as a graphical symbol for a galvanic cell which has the terminals 12, 13 and 14. The main section terminal 12 is thereby connected to the main section 2 of the electrode 2, 3, and the measurement terminal 13 to the measurement section 3 of the electrode 2, 3. The electrode 2, 3 is implemented as a cathode. The counterelectrode terminal 14 is connected to the counterelectrode 4 embodied as an anode.

Figure 2B:
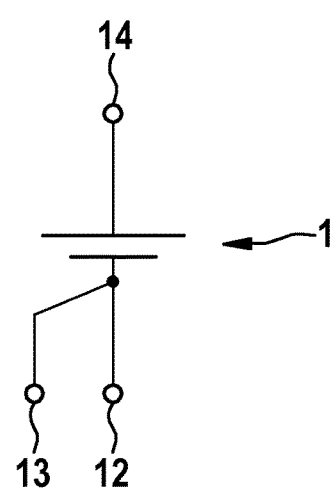
FIG. 2b shows a circuit symbol of a second variant of the energy store according to the invention.

FIG. 2b shows a further variant of the energy store 1 as a circuit symbol. In this example, the anode is configured as a divided electrode 2, 3. The main section 2 is connected in turn to the main section terminal 12 and the measurement section 3 to the measurement terminal 13. The counterelectrode 4 implemented as a cathode is connected to the counterelectrode terminal 14.

Figure 3:
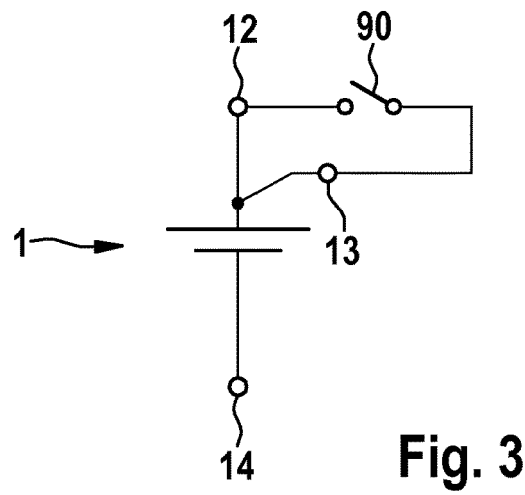
FIG. 3 shows a schematic circuit diagram of a circuit arrangement of an embodiment of the invention.

FIG. 3 shows schematically a circuit diagram of a circuit arrangement for matching the potentials of the measurement section 3 and the main section 2 of the electrode. A matching device 90 is connected between the main section terminal 12 and the measurement terminal 13. The matching device 90 is depicted as a switching element and can be implemented by components or assemblies, such as relays, MOSFETs, bipolar transistors, thyristors and/or a power source. The main cell and the measurement cell can be connected to one another by means of the matching device 90. An equalizing current flows via the matching device from the main section 2 to the measurement section 3 or vice versa depending on which section has the higher potential. The electric circuit is closed across the main cell 2, 4 and the measurement cell 3, 4, wherein an equalizing current can flow from the counterelectrode main section to the counterelectrode measurement section or vice versa.

The invention claimed is:

1. A lithium-ion energy store comprising:
   an electrode having a main section and a measurement section electrically isolated from the main section,
   a counterelectrode, and
   a separator between the electrode and the counterelectrode,
   a measurement cell including the measurement section of the electrode, a counterelectrode measurement section, which is opposite the measurement section of the electrode in relation to the separator, and wherein a section of the separator is arranged between the measurement section of the electrode and the counterelectrode measurement section, a main cell including the main section of the electrode, a counterelectrode main section, which is opposite the main section of the electrode in relation to the separator, and a section of the separator which is arranged between the main section of the electrode and the counterelectrode main section, and a matching device by means of which an electrical potential of the measurement section of the electrode and an electrical potential of the main section of the electrode can be matched to one another, wherein matching of the potentials of the measurement section of the electrode and of the main section of the electrode is carried out prior to a measurement with the measurement cell.

2. The lithium-ion energy store according to claim 1, in which a low-impedance connection between the main section of the electrode and the measurement section of the electrode can be established by means of the matching device.

3. The lithium-ion energy store according to claim 1, in which the matching device comprises a relay, a field effect transistor, a bipolar transistor, a thyristor or/and a power source.

4. A method for matching the potentials of the measurement section of the electrode and of the main section of the electrode of a lithium-ion energy store according to claim 1, by the measurement section of the electrode being electrically connected to the main section of the electrode by means of the matching device.

5. The method according to claim 4, in which the electrical connection is effected by closing a relay, through-connecting a field transistor and/or a bipolar transistor, igniting a thyristor and/or by means of a power source.

* * * * *